United States Patent
Koo et al.

(10) Patent No.: US 6,913,694 B2
(45) Date of Patent: Jul. 5, 2005

(54) SELECTIVE MEMBRANE HAVING A HIGH FOULING RESISTANCE

(75) Inventors: Ja-Young Koo, Billerica, MA (US); Sung Pyo Hong, Kyungsan (KR); Jin Woo Kang, Cheju (KR); Nowon Kim, Busan (KR)

(73) Assignee: Saehan Industries Incorporation, Kyongson-si (KR)

( * ) Notice: Subject to any disclaimer, the term of this patent is extended or adjusted under 35 U.S.C. 154(b) by 214 days.

(21) Appl. No.: 09/992,578

(22) Filed: Nov. 6, 2001

(65) Prior Publication Data

US 2003/0121844 A1 Jul. 3, 2003

(51) Int. Cl.$^7$ .............................................. B01D 39/00
(52) U.S. Cl. ......................... 210/500.38; 210/500.23; 210/500.27; 210/490; 210/504; 428/474.4; 428/475.5
(58) Field of Search ...................... 210/500.21–500.42, 210/650–654, 490; 428/474.4, 475.5, 474.9, 475.8, 475.4

(56) References Cited

U.S. PATENT DOCUMENTS

| | | | |
|---|---|---|---|
| 4,778,596 A | * | 10/1988 | Linder et al. ............... 210/638 |
| 4,915,839 A | * | 4/1990 | Marinaccio et al. ... 210/500.23 |
| 5,178,766 A | | 1/1993 | Ikeda et al. |
| 6,177,011 B1 | | 1/2001 | Hachisuka et al. |
| 6,245,234 B1 | | 6/2001 | Koo et al. |
| 6,280,853 B1 | * | 8/2001 | Mickols ................... 428/474.4 |

\* cited by examiner

Primary Examiner—W. L. Walker
Assistant Examiner—Krishnan S Menon
(74) Attorney, Agent, or Firm—Kriegsman & Kriegsman

(57) ABSTRACT

A selective membrane having a high fouling resistance. In one embodiment, the selective membrane is a composite polyamide reverse osmosis membrane in which a hydrophilic coating has been applied to the polyamide layer of the membrane, the hydrophilic coating being made by (i) applying to the membrane a quantity of a polyfunctional epoxy compound, the polyfunctional epoxy compound comprising at least two epoxy groups, and (ii) then, cross-linking the polyfunctional epoxy compound in such a manner as to yield a water-insoluble polymer.

18 Claims, No Drawings

SELECTIVE MEMBRANE HAVING A HIGH FOULING RESISTANCE

BACKGROUND OF THE INVENTION

The present invention relates generally to selective membranes and relates more particularly to selective membranes having a high fouling resistance.

It is known that dissolved substances can be separated from their solvents by the use of various types of selective membranes, such selective membranes including—listed in order of increasing pore size—reverse osmosis membranes, ultrafiltration membranes and microfiltration membranes. One use to which reverse osmosis membranes have previously been put is in the desalination of brackish water or seawater to provide large volumes of relatively non-salty water suitable for industrial, agricultural or home use. What is involved in the desalination of brackish water or seawater using reverse osmosis membranes is literally a filtering out of salts and other dissolved ions or molecules from the salty water by forcing the salty water through a reverse osmosis membrane whereby purified water passes through the membrane while salts and other dissolved ions and molecules do not pass through the membrane. Osmotic pressure works against the reverse osmosis process, and the more concentrated the feed water, the greater the osmotic pressure which must be overcome.

A reverse osmosis membrane, in order to be commercially useful in desalinating brackish water or seawater on a large scale, must possess certain properties. One such property is that the membrane have a high salt rejection coefficient. In fact, for the desalinated water to be suitable for many commercial applications, the reverse osmosis membrane should have a salt rejection capability of at least about 97%. Another important property of a reverse osmosis membrane is that the membrane possess a high flux characteristic, i.e., the ability to pass a relatively large amount of water through the membrane at relatively low pressures. Typically, the flux for the membrane should be greater than 10 gallons/$ft^2$-day (gfd) at a pressure of 800 psi for seawater and should be greater than 15 gfd at a pressure of 220 psi for brackish water. For certain applications, a rejection rate that is less than that which would otherwise be desirable may be acceptable in exchange for higher flux and vice versa.

One common type of reverse osmosis membrane is a composite membrane comprising a microporous support and a thin polyamide film formed on the microporous support. Typically, the polyamide film is formed by an interfacial polymerization of a polyfunctional amine and a polyfunctional acyl halide.

An example of the aforementioned composite polyamide reverse osmosis membrane is disclosed in U.S. Pat. No. 4,277,344, inventor Cadotte, which issued Jul. 7, 1981, and which is incorporated herein by reference. The aforementioned patent describes an aromatic polyamide film which is the interfacial reaction product of an aromatic polyamine having at least two primary amines substituents with an aromatic acyl halide having at least three acyl halide substituents. In the preferred embodiment, a porous polysulfone support is coated with m-phenylenediamine in water. After removal of excess m-phenylenediamine solution from the coated support, the coated support is covered with a solution of trimesoyl chloride dissolved in "FREON" TF solvent (trichlorotrifluoroethane). The contact time for the interfacial reaction is 10 seconds, and the reaction is substantially complete in 1 second. The resulting polysulfone/polyamide composite is then air-dried.

Although the Cadotte membrane described above exhibits good flux and good salt rejection, various approaches have been taken to further improve the flux and salt rejection of composite polyamide reverse osmosis membranes. In addition, other approaches have been taken to improve the resistance of said membranes to chemical degradation and the like. Many of these approaches have involved the use of various types of additives to the solutions used in the interfacial polycondensation reaction.

For example, in U.S. Pat. No. 4,872,984, inventor Tomaschke, which issued Oct. 10, 1989, and which is incorporated herein by reference, there is disclosed an aromatic polyamide membrane formed by (a) coating a microporous support with an aqueous solution comprising (i) an essentially monomeric, aromatic, polyamine reactant having at least two amine functional groups and (ii) a monofunctional, monomeric (i.e., polymerizable) amine salt to form a liquid layer on the microporous support, (b) contacting the liquid layer with an organic solvent solution of an essentially monomeric, aromatic, amine-reactive reactant comprising a polyfunctional acyl halide or mixture thereof, wherein the amine-reactive reactant has, on the average, at least about 2.2 acyl halide groups per reactant molecule, and (c) drying the product of step (b), generally in an oven at about 60° C. to 110° C. for about 1 to 10 minutes, so as to form a water permeable membrane.

Other patents disclosing the use of additives in the solutions employed in the interfacial polycondensation reaction include: U.S. Pat. No. 4,983,291, inventors Chau et al., which issued Jan. 8, 1991; U.S. Pat. No. 5,576,057, inventors Hirose et al., which issued Nov. 19, 1996; U.S. Pat. No. 5,614,099, inventors Hirose et al., which issued Mar. 25, 1997; U.S. Pat. No. 4,950,404, inventor Chau, which issued Aug. 21, 1990; U.S. Pat. No. 4,830,885, inventors Tran et al., which issued May 16, 1989; U.S. Pat. No. 6,245,234, inventors Koo et al., which issued Jun. 12, 2001; U.S. Pat. No. 6,063,278, inventors Koo et al., which issued May 16, 2000; and U.S. Pat. No. 6,015,495, inventors Koo et al., which issued Jan. 18, 2000, all of which are incorporated herein by reference.

Another approach which has been taken to improve the performance of a composite polyamide reverse osmosis membrane is disclosed in U.S. Pat. No. 5,178,766, inventors Ikeda et al., which issued Jan. 12, 1993, and which is incorporated herein by reference. According to Ikeda et al., the salt rejection rate of a composite polyamide reverse osmosis membrane is said to be improved by covalently bonding to the polyamide film of said membrane a compound having a quaternary nitrogen atom. Said quaternary nitrogen atom-containing compound is bonded to the polyamide film through a reactive group present in the compound, said reactive group being an epoxy group, an aziridine group, an episulfide group, a halogenated alkyl group, an amino group, a carboxylic group, a halogenated carbonyl group, or a hydroxy group.

One problem encountered by many of the various composite polyamide reverse osmosis membranes described above is fouling, i.e., the undesired adsorption of solutes to the membrane, thereby causing a reduction in flux exhibited by the membrane. Fouling is typically caused by hydrophobic-hydrophobic and/or ionic interactions between the polyamide film of the membrane and those solutes present in the solution being filtered. As can readily be appreciated, fouling is undesirable not only because it results in a reduction in flux performance for the membrane but also because it requires that operating pressures be varied frequently to compensate for the variations in flux experienced during said reduction. In addition, fouling also requires that the membrane be cleaned frequently.

One approach to the problem of fouling is disclosed in U.S. Pat. No. 6,177,011, inventors Hachisuka et al., which issued Jan. 23, 2001, and which is incorporated herein by reference. According to Hachisuka et al., fouling can be reduced by coating the polyamide film of the membrane with at least one substance selected from the group consisting of an electrically neutral organic substance and a polymer that has a nonionic hydrophilic group, said organic substance or polymer preferably being a polyvinyl alcohol.

SUMMARY OF THE INVENTION

It is an object of the present invention to provide a novel fouling resistant selective membrane.

It is another object of the present invention to provide a novel composite polyamide reverse osmosis membrane that possesses high fouling resistance.

The present invention is premised on the unexpected discovery that the resistance of a composite polyamide reverse osmosis membrane to fouling can be significantly improved by treating said membrane with a hydrophilic coating, said hydrophilic coating being made by (i) applying to the membrane a quantity of a polyfunctional epoxy compound, said polyfunctional epoxy compound comprising at least two epoxy groups, and (ii) then, cross-linking the polyfunctional epoxy compound in such a manner as to yield a water-insoluble polymer. Typically, said cross-linking step involves the opening of said epoxy groups by nucleophilic attack to yield an ether or an alcohol.

Where the polyfunctional epoxy compound has exactly two epoxy groups, said cross-linking step comprises bonding the polyfunctional epoxy compound to a cross-linking compound, said cross-linking compound comprising at least three epoxy-reactive groups. (Although, it should be noted that a polyfunctional epoxy compound having exactly two epoxy groups can also be cross-linked by a diamino compound having two primary amino groups, two secondary amino groups, or one primary amino group and one secondary amino group.) By contrast, where the polyfunctional epoxy compound has three or more epoxy groups, said cross-linking step comprises the self-polymerization of the polyfunctional epoxy compound and/or the bonding of the polyfunctional epoxy compound to a cross-linking compound comprising at least two epoxy-reactive groups.

The present invention is also directed to a method of producing the above-described composite polyamide reverse osmosis membrane having a high fouling resistance coating.

The present invention is further directed to microfiltration membranes and ultrafiltration membranes that include the high fouling resistance coating of the present invention, as well as to a method of making such coated membranes.

Additional objects, features, aspects and advantages of the present invention will be set forth, in part, in the description which follows and, in part, will be obvious from the description or may be learned by practice of the invention. Certain embodiments of the invention will be described hereafter in sufficient detail to enable those skilled in the art to practice the invention, and it is to be understood that other embodiments may be utilized and that structural or other changes may be made without departing from the scope of the invention. The following detailed description is, therefore, not to be taken in a limiting sense, and the scope of the present invention is best defined by the appended claims.

DETAILED DESCRIPTION OF PREFERRED EMBODIMENTS

As noted above, the present invention is based on the unexpected discovery that the fouling resistance of a selective membrane, such as composite polyamide reverse osmosis membrane, a microfiltration membrane or an ultrafiltration membrane, can be significantly increased by treating said membrane with a hydrophilic coating, said hydrophilic coating being made by (i) applying to the membrane a quantity of a polyfunctional epoxy compound, said polyfunctional epoxy compound comprising at least two epoxy groups, and (ii) then, cross-linking the polyfunctional epoxy compound in such a manner as to yield a water-insoluble polymer.

The composite polyamide reverse osmosis membrane to which the hydrophilic coating of the present invention is applied may be virtually any composite polyamide reverse osmosis membrane of the type comprising a porous support and a polyamide film disposed on said porous support.

The aforementioned porous support is typically a microporous support. The particular microporous support employed is not critical to the present invention but is generally a polymeric material containing pore sizes which are of sufficient size to permit the passage of permeate therethrough but not large enough so as to interfere with the bridging over of the ultrathin membrane formed thereon. The pore size of the support will generally range from 1 to 500 nanometers in as much as pores which are larger in diameter than 500 nanometers will permit the ultrathin film to sag into the pores, thus disrupting the flat sheet configuration desired. Examples of microporous supports useful in the present invention include those made of a polysulfone, a polyether sulfone, a polyimide, a polyamide, a polyetherimide, polyacrylonitrile, poly(methyl methacrylate), polyethylene, polypropylene and various halogenated polymers, such as polyvinylidene fluoride. Additional microporous support materials may be found in the patents incorporated herein by reference.

The thickness of the microporous support is not critical to the present invention. Generally, the thickness of the microporous support is about 25 to 125 $\mu$m, preferably about 40 to 75 $\mu$m.

The polyamide film of the present invention is typically the interfacial reaction product of a polyfunctional amine reactant and a polyfunctional amine-reactive reactant. The polyfunctional amine reactant employed in the present invention is preferably an essentially monomeric amine having at least two amine functional groups, more preferably 2 to 3 amine functional groups. The amine functional group is typically a primary or secondary amine functional group, preferably a primary amine functional group. The particular polyamine employed in the present invention is not critical thereto and may be a single polyamine or a combination thereof. Examples of suitable polyamines include aromatic primary diamines, such as meta-phenylenediamine and para-phenylenediamine and substituted derivatives thereof, wherein the substituent includes, e.g., an alkyl group, such as a methyl group or an ethyl group, an alkoxy group, such as a methoxy group or an ethoxy group, a hydroxy alkyl group, a hydroxy group or a halogen atom. Additional examples of suitable polyamines include alkanediamines, such as 1,3-propanediamine and its homologs with or without N-alkyl or aryl substituents, cycloaliphatic primary diamines, such as cyclohexane diamine, cycloaliphatic secondary diamines, such as piperazine and its alkyl derivatives, aromatic secondary amines, such as N,N'-dimethyl-1,3-phenylenediamine, N,N'-diphenylethylene diamine, benzidine, xylylene diamine and derivatives thereof. Other suitable polyamines may be found in the patents incorporated herein by reference. The preferred polyamines of the present invention are aromatic primary diamines, more preferably m-phenylenediamine, and piperazine. (A composite polyamide reverse osmosis membrane made using piperazine as the polyfunctional amine reactant falls within a subclass of composite polyamide reverse osmosis membranes known as nanofiltration membranes. Nanofiltration membranes have larger "pores"

than other composite polyamide reverse osmosis membranes and exhibit a low rejection rate of monovalent salts while exhibiting a high rejection rate of divalent salts and organic materials having a molecular weight greater than 300. Nanofiltration membranes are typically used to remove calcium and magnesium salts from water, i.e., to soften hard water, and to remove natural organic matter, such as humic acids from decaying plant leaves, from water. Humic acid is negatively charged at a pH above 6 and can be adsorbed on the membrane through hydrophobic interactions with the membrane surface.)

The polyfunctional amine reactant is typically present in an aqueous solution in an amount in the range of from about 0.1 to 20%, preferably 0.5 to 8%, by weight, of the aqueous solution. The pH of the aqueous solution is in the range of from about 7 to 13. The pH can be adjusted by the addition of a basic acid acceptor in an amount ranging from about 0.001% to about 5%, by weight, of the solution. Examples of the aforementioned basic acid acceptor include hydroxides, carboxylates, carbonates, borates, phosphates of alkali metals, and trialkylamines.

In addition to the aforementioned polyfunctional amine reactant (and, if desired, the aforementioned basic acid acceptor), the aqueous solution may further comprise additives of the type described in the patents incorporated herein by reference, such additives including, for example, polar solvents, amine salts and polyfunctional tertiary amines (either in the presence or absence of a strong acid).

The polyfunctional amine-reactive reactant employed in the present invention is one or more compounds selected from the group consisting of a polyfunctional acyl halide, a polyfunctional sulfonyl halide and a polyfunctional isocyanate. Preferably, the polyfunctional amine-reactive reactant is an essentially monomeric, aromatic, polyfunctional acyl halide, examples of which include di- or tricarboxylic acid halides, such as trimesoyl chloride (TMC), isophthaloyl chloride (IPC), terephthaloyl chloride (TPC) and mixtures thereof. Examples of other polyfunctional amine-reactive reactants are disclosed in the patents incorporated herein by reference.

The polyfunctional amine-reactive reactant is typically present in an organic solvent solution, the solvent for said organic solvent solution comprising any organic liquid immiscible with water. The polyfunctional amine-reactive reactant is typically present in the organic liquid in an amount in the range of from about 0.005 to 5 wt % preferably 0.01 to 0.5 wt % of the solution. Examples of the aforementioned organic liquid include hexane, cyclohexane, heptane, alkanes having from 8 to 12 carbon atoms, and halogenated hydrocarbons, such as the FREON series. Other examples of the above-described organic liquid may be found in the patents incorporated herein by reference. Preferred organic solvents are alkanes having from 8 to 12 carbon atoms and mixtures thereof. ISOPAR® solvent (Exxon Corp.) is such a mixture of alkanes having from 8 to 12 carbon atoms.

In accordance with the teachings of the present invention, an uncoated composite polyamide reverse osmosis membrane is made as follows: First, the above-described porous support is coated with the above-described aqueous solution utilizing either a hand coating or a continuous operation, and the excess solution is removed from the support by rolling, sponging, air knifing or other suitable techniques. Following this, the coated support material is then contacted, for example, by dipping or spraying, with the above-described organic solvent solution and allowed to remain in place for a period of time in the range of from about 5 seconds to about 10 minutes, preferably about 20 seconds to 4 minutes. The resulting product is then dried at a temperature below 50° C., preferably by air-drying at room temperature, for about 1 minute, then rinsed in a basic aqueous solution, such as 0.2% sodium carbonate, for about 1 to 30 minutes at about room temperature to 95° C., and then rinsed with deionized water.

With the above-described composite polyamide reverse osmosis membrane preferably still wet from having been rinsed with deionized water, the hydrophilic coating of the present invention is then formed on the membrane by (i) applying to the polyamide film of the membrane a quantity of a polyfunctional epoxy compound, said polyfunctional epoxy compound comprising at least two epoxy groups, and (ii) then, cross-linking the polyfunctional epoxy compound in such a manner as to yield a water-insoluble polymer. Said cross-linking step is very important because the polyfunctional epoxy compound, in the absence of said cross-linking, is water-soluble and will, therefore, be washed off the membrane surface during use.

Where the polyfunctional epoxy compound has exactly two epoxy groups, said cross-linking step comprises bonding the polyfunctional epoxy compound to a cross-linking compound having at least three epoxy-reactive groups. Such a cross-linking compound is necessary because the self-polymerization of a polyfunctional epoxy compound having exactly two epoxy groups yields a linear ladder-type polymer that is soluble in water and, therefore, will not remain on the membrane during use. (Although, it should be noted that a polyfunctional epoxy compound having exactly two epoxy groups can also be cross-linked by a diamino compound having two primary amino groups, two secondary amino groups, or one primary amino group and one secondary amino group.) By contrast, where the polyfunctional epoxy compound has three or more epoxy groups, said cross-linking step comprises the self-polymerization of the polyfunctional epoxy compound and/or the bonding of the polyfunctional epoxy compound to a cross-linking compound having at least two epoxy-reactive groups. In view of the above, it should be appreciated that a polyfunctional epoxy compound having exactly two epoxy groups can be polymerized with a polyfunctional epoxy compound having three of more epoxy groups.

Typically, said cross-linking step involves the opening of said epoxy groups by nucleophilic attack, with the oxygen atom of the epoxy ring used to form an ether or an alcohol. Said cross-linking may be catalyzed by a base catalyst, by an acid catalyst or by heat. Examples of said base catalyst include alkoxide salts, such as sodium ethoxide; hydroxide salts, such as sodium hydroxide and potassium hydroxide; carbonate salts, such as potassium carbonate; phosphate salts, such as trisodium phosphate; phenoxide salts, such as sodium phenoxide; borate salts, such as sodium borate; carboxylate salts, such as potassium acetate; ammonia; and primary, secondary and tertiary amines.

Said acid catalyst may be an inorganic acid, an organic acid, or a Lewis acid. More specifically, examples of said acid catalyst include sulfuric acid; hydrochloric acid; nitric acid; an aromatic sulfonic acid; an aliphatic sulfonic acid; a cycloaliphatic sulfonic acid; a carboxylic acid; a fluorinated carboxylic acid, such as trifluoroacetic acid; phenol and its derivatives; boric acid; tetrafluoroboric acid; aluminum trihalide; an aluminum trialkoxide; a boron trihalide, such as a boron trifluoride; zinc tetrafluoroborate; a tin tetrahalide, such as tin tetrachloride; a quaternary ammonium salt; and an acid salt of ammonia or a primary, secondary or tertiary amine.

Catalysis by heat may, for example, comprise heating the coating at 10° C. to 200° C., preferably 20° C. to 150° C., for a time period of about 1 second to 7 days, preferably about 5 seconds to 3 days.

Examples of polyfunctional epoxy compounds having exactly two epoxy groups for use in the present invention include ethyleneglycol diglycidyl ether; propylene glycol diglycidyl ether; 1,3-propanediol diglycidyl ether; 1,3-butanediol diglycidyl ether; 1,4-butanediol diglycidyl ether; 1,5-pentanediol diglycidyl ether; 1,2-pentanediol diglycidyl ether; 2,4-pentanediol diglycidyl ether; 1,6-hexanediol diglycidyl ether; 1,2-hexanediol diglycidyl ether; 1,5-hexanediol diglycidyl ether; 2,5-hexanediol diglycidyl ether; 2-ethyl-1,3-hexanediol diglycidyl ether; 1,7-heptanediol diglycidyl ether; 1,2-octanediol diglycidyl ether; 1,8-octanediol diglycidyl ether; 1,9-nonanediol diglycidyl ether; 1,10-decanediol diglycidyl ether; 1,2-decanediol diglycidyl ether; 1,12-dodecanediol diglycidyl ether; 1,2-dodecanediol diglycidyl ether; glycerol diglycidyl ether; trimethylolpropane diglycidyl ether; 1,1,1-tris(hydroxymethyl)ethane diglycidyl ether; pentaerythritol diglycidyl ether; sorbitol diglycidyl ether; neopentyl glycol diglycidyl ether; dibromoneopentyl glycol diglycidyl ether; hydroquinone diglycidyl ether; resorcinol diglycidyl ether; bisphenol A diglycidyl ether; hydrogenated bisphenol A diglycidyl ether; polyethylene glycol diglycidyl ether with the repeating ethylene glycol unit $(CH_2CH_2O)_n$ wherein n is an integer ranging from 2 to 400, inclusive; and polypropylene glycol diglycidyl ether with the repeating propylene glycol unit $((CH_3)CH_2CH_2O)_n$ wherein n is an integer ranging from 2 to 100, inclusive.

Examples of polyfunctional epoxy compounds having exactly three epoxy groups for use in the present invention include glycerol triglycidyl ether; diglycerol triglycidyl ether; pentaerythritol triglycidyl ether; sorbitol triglycidyl ether; glycerol propoxylate triglycidyl ether; trimethylolpropane triglycidyl ether; 1,1,1-tris(hydroxymethyl)ethane triglycidyl ether; 1,1,1-tris(hydroxyphenyl)ethane triglycidyl ether; tris(hydroxymethyl)nitromethane triglycidyl ether; tris(2,3-epoxypropyl)isocyanurate; phloroglucinol triglycidyl ether; N,N-diglycidyl-4-glycidyloxyaniline; a reaction product of epichlorohydrin and 1,3,5,-tris(2-hydroxyethyl) cyanuric acid; and a reaction product of epichlorohydrin and tris(hydroxymethyl)amino methane.

Examples of polyfunctional epoxy compounds having exactly four epoxy groups for use in the present invention include sorbitol tetraglycidyl ether; pentaerythritol tetraglycidyl ether; polyglycerol tetraglycidyl ether; and 4,4'-methylenebis(N,N-diglycidylaniline).

Examples of polyfunctional epoxy compounds having more than four epoxy groups for use in the present invention include sorbitol pentaglycidyl ether; sorbitol hexaglycidyl ether; polyglycerol polyglycidyl ether; epoxy cresol novolac resin; reaction products of polyvinyl alcohol and epichlorohydrin; reaction products of polyvinyl phenol and epichlorohydrin; reaction products of polyacrylamide and epichlorohydrin; and reaction products of epichlorohydrin and cellulose and its derivatives, such as hydroxyethyl cellulose and hydroxypropyl cellulose.

It should be noted that all of the polyfunctional epoxy compounds listed above are the reaction product of epichlorohydrin and a polyfunctional hydroxy, amino and/or amide compound, said reaction preferably being catalyzed with sodium hydroxide. Examples of such polyfunctional hydroxy, amino and/or amide compounds include ethylene glycol; propylene glycol; 1,3-propanediol; 1,3-butanediol; 1,4-butanediol; 1,5-pentanediol; 1,2-pentanediol; 2,4-pentanediol; 1,6-hexanediol; 1,2-hexanediol; 1,5-hexanediol; 2,5-hexanediol; 2-ethyl-1,3-hexanediol; 1,7-heptanediol; 1,2-octanediol; 1,8-octanediol; 1,9-nonanediol; 1,10-decanediol; 1,2-decanediol; 1,12-dodecanediol; 1,2-dodecanediol; glycerol; trimethylolpropane; 1,1,1-tris(hydroxymethyl)ethane; tris(hydroxymethyl)aminomethane; 1,3,5-tris(2-hydroxyethyl)cyanuric acid; pentaerythritol; sorbitol; neopentyl glycol; dibromoneopentyl glycol; hydroquinone; resorcinol; bisphenol A; hydrogenated bisphenol A; isocyanuric acid; phloroglucinol; methylenebisaniline; novolac resin; polyvinyl alcohol; polyvinyl phenol; polyacrylamide; celluose and its derivatives, such as hydroxyethyl cellulose and hydroxypropyl cellulose; chitosan; polyethylene glycol with the repeating ethylene glycol unit $(CH_2CH_2O)_n$ wherein n ranges from 2 to 400, inclusive; and polypropylene glycol with the repeating propylene glycol unit $((CH_3)CH_2CH_2O)_n$ wherein n ranges from 2 to 100, inclusive.

In view of the above, it can readily be appreciated that the polyfunctional epoxy compound of the present invention could be formed in the aforementioned manner by first reacting epichlorohydrin and a polyfunctional compound of the type described above and then applying the resulting reaction product to the polyamide film of the membrane; alternatively, the polyfunctional epoxy compound could be formed in situ on the polyamide film of the membrane by applying thereto (in the presence of a suitable catalyst) the combination of epichlorohydrin and an appropriate polyfunctional reactant.

As noted above, where a cross-linking compound is used to cross-link polyfunctional epoxy compounds having three or more epoxy groups, said cross-linking compound must have two or more epoxy-reactive groups, and where a cross-linking compound is used to cross-link polyfunctional epoxy compounds having exactly two epoxy groups, said cross-linking compound must have three or more epoxy-reactive groups. (Although, as noted above, a polyfunctional epoxy compound having exactly two epoxy groups can also be cross-linked by a diamino compound having two primary amino groups, two secondary amino groups, or one primary amino group and one secondary amino group. This is because, the primary and secondary amino groups, after reacting with one epoxy group, become secondary and tertiary amino groups, respectively, which can still react with an additional epoxy group.) Examples of epoxy-reactive groups suitable for use in the cross-linking compounds of the present invention include hydroxy groups; amino groups including primary, secondary and tertiary amines; carboxyl groups; carboxylic acid anhydride groups; amide groups; carbonyl groups including aldehyde groups and urea groups; and sulfurhydryl (thiol) groups. The two or more epoxy-reactive groups of a cross-linking compound of the present invention may be the same type of epoxy-reactive group or may be a combination of different types of epoxy-reactive groups.

Examples of compounds that have exactly two epoxy-reactive groups, both of which are hydroxy groups, and are suitable for use in the present invention as cross-linking compounds include ethylene glycol; propylene glycol; 1,3-propanediol; 1,3-butanediol; 1,4-butanediol; 1,5-pentanediol; 1,2-pentanediol; 2,4-pentanediol; 1,6-hexanediol; 1,2-hexanediol; 1,5-hexanediol; 2,5-hexanediol; 2-ethyl-1,3-hexanediol; 1,7-heptanediol; 1,2-octanediol; 1,8-octanediol; 1,9-nonanediol; 1,10-decanediol; 1,2-decanediol; 1,12-dodecanediol; 1,2-dodecanediol; neopentyl glycol; dibromoneopentyl glycol; hydroquinone, resorcinol; bisphenol A; hydrogenated bisphenol A; polyethylene glycol with the repeating ethylene glycol unit $(CH_2CH_2O)_n$ wherein n ranges from 2 to 400, inclusive; and polypropylene glycol with the repeating ethylene glycol unit $((CH_3)CH_2CH_2O)_n$ wherein n ranges from 2 to 100, inclusive.

Examples of compounds that have more than two epoxy-reactive groups, all of which are hydroxy groups, and are suitable for use in the present invention as cross-linking compounds include glycerol; trimethylolpropane; 1,1,1-tris(hydroxymethyl)ethane; 1,1,1-tris(hydroxyphenyl)ethane; tris(hydroxymethyl)aminomethane; tris(hydroxymethyl)nitromethane; 1,3,5-tris(2-hydroxyethyl)cyanuric acid; pentaerythritol; sorbitol; glucose; fructose; maltose; mannose; glucosamine; mannosamine; a polysaccharide, such as sucrose; isocyanuric acid; phloroglucinol; methylenebisaniline; novolac resin; polyvinyl alcohol; polyvinyl phenol; polyacrylamide; and cellulose and its derivatives, such as hydroxyethyl cellulose, hydroxypropyl cellulose, ethylcelluose and methyl cellulose.

Examples of compounds that have exactly two epoxy-reactive groups, both of which are amino groups (which may be primary, secondary and/or tertiary amino groups), and are suitable for use in the present invention as cross-linking compounds (e.g., with polyfunctional epoxy compounds having three or more epoxy groups) include alkanediamines and their alkyl or aryl derivatives on nitrogens and backbone carbons of the types shown below:

$H_2N(CH_2)_nNH_2$ wherein n=2–12;

$R_1R_2N(CH_2)_nNR_3R_4$ wherein n=2–12 and $R_1$, $R_2$, $R_3$ and $R_4$ are the same or different and are selected from the group consisting of hydrogen, methyl, ethyl, propyl, butyl, cyclohexyl and phenyl, examples of which include N,N,N',N'-tetramethyl-1,4-butanediamine; N,N,N',N'-tetramethyl-1,6-hexanediamine; N,N,N',N'-tetramethyl-1,3-propanediamine; and N,N,N',N'-tetramethylethylenediamine;

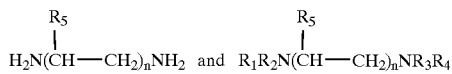

wherein n=2–12 and $R_1$, $R_2$, $R_3$, $R_4$, and $R_5$ are the same or different and are selected from the group consisting of hydrogen, methyl, ethyl, propyl, butyl, cyclohexyl, hydroxyl and phenyl, examples of which include N,N,N', N'-tetramethyl-1,3-butanediamine; and N,N',N'-tetramethyl-1,3-diamino-2-propanol;

Alicyclic diamines selected from the group consisting of diaminocyclohexane; 1,3-cyclohexanebis(methylamine); 4,4'-trimethylenedipiperidine; piperazine; 1,4-dimethylpiperazine; 1,4-diazabicyclo[2.2.2]octane; 1,8-diazabicyclo[5.4.0]undec-7-ene; 1,5-diazabicyclo[4.3.0]non-5-ene; and Aromatic diamines, such as meta-phenylenediamine; and meta-xylylenediamine; and bis(4-aminophenyl)sulfone.

Other examples of suitable diamino compounds include N,N,N',N'-tetramethyl-2-butene-1,4-diamine, which is similar to the aforementioned N,N,N',N'-tetramethyl-1,4-butanediamine, except that it has one double bond in the backbone.

Examples of compounds that have three or more epoxy-reactive groups, all of said three or more epoxy-reactive groups being amino groups (which may be primary, secondary, and/or tertiary amino groups), and are suitable for use in the present invention as cross-linking compounds include N,N'-bis(2-aminoethyl)-1,3-propanediamine, diethylenetriamine, triethylenetetramine; tris(2-aminoethyl) amine; N,N,N',N',N"-pentamethyldiethylenetriamine; tri-aminobenzene; 1,1,3,3-tetramethylguanidine; polyethylenimine; chitosan; poly(allylamine); and polyvinylpyridine.

Membrane coatings of the present invention that are prepared using cross-linking compounds containing amino groups may impart an overall positive charge to the membrane (depending upon the number of amino groups actually incorporated into the coating). As a result, such coated membranes may possess good fouling resistance to positively charged solutes and, therefore, may be particularly well-suited for treating, for example, water containing positively charged compounds with some hydrophobic character, such as cationic surfactants. By comparison, membrane coatings prepared with anionic cross-linking compounds having both hydroxy and acidic or anionic groups, such as tartaric acid; gluconic acid; glucuronic acid; 3,5-dihydroxybenzoic acid; 2,5-dihydroxybenzenesulfonic acid potassium salt; and 2,5-dihydroxy-1,4-benzenedisulfonic acid dipotassium salt, may impart an overall negative charge to the membrane. Consequently, such coated membranes may be particularly well-suited for treating, for example, water containing negatively charged solutes. On the other hand, membrane coatings prepared using cross-linking compounds containing neutral groups, such as hydroxy groups, amide groups and carbonyl groups, result in a more neutrally charged membrane. Consequently, such a coated membrane may be more universally applicable to treating water containing either positively charged or negatively charged matter. Lastly, a membrane coating having both negative and positive charges can be prepared using cross-linking compounds having zwitter ions. Examples of such compounds include 3,5-diaminobenzoic acid; 2-aminoethanesulfonic acid (taurine); 2-{[tris (hydroxymethyl)methyl]amino}-1-ethanesulfonic acid; 3-{[tris(hydroxymethyl)methyl]amino}-1-propanesulfonic acid; 2-hydroxy-3-{[tris(hydroxymethyl)methyl]amino}-1-propanesulfonic acid; β-hydroxy-4-(2-hydroxyethyl)-1-piperazinepropanesulfonic acid; β,β'-dihydroxy-1,4-piperazinebis(propanesulfonic acid); and 2,5-diaminobenzenesulfonic acid. In any event, it can be seen from the above discussion that the charge of the membrane coating can be tailored to exhibit high resistance to fouling by variously charged or uncharged solutes.

Where the polyfunctional epoxy compound is first formed and then applied to the membrane, the polyfunctional epoxy compound is preferably applied to the membrane as part of a coating solution comprising the polyfunctional epoxy compound and a solvent of water and/or an alcohol. In such a coating solution, the polyfunctional epoxy compound is typically present in an amount ranging from about 0.00001 wt % to 20 wt % of the solution, preferably about 0.0001 wt % to 5 wt % of the solution. (A cross-linker, if needed, is also preferably included in the coating solution.) The coating solution is then sprayed, T-die coated, meniscus coated or cloth coated onto the top surface of the polyamide film of the membrane for a time period of about 1 second to 10 minutes, preferably about 5 seconds to 5 minutes. Where cross-linking is catalyzed by heat, the coated membrane is then dried and cured at 10° C. to 200° C., preferably 20° C. to 150° C., for a time period of about 1 second to 7 days, preferably about 5 seconds to 3 days.

As noted above, the hydrophilic coating of the present invention is not limited to use with composite polyamide reverse osmosis membranes but can also be applied directly to conventional microporous membranes, such as microfiltration membranes and ultrafiltration membranes, to help resist fouling thereof by proteins, macromolecules and colloids when such membranes are used in surface water treatment, protein separations, and food and beverage processing. A conventional microfiltration membrane is typically a microporous support of the type described above that has a pore size of about 0.1µ-10µ. A conventional ultrafiltration membrane is typically a microporous support of the type described above that has a pore size of about 0.001µ-0.05µ.

The following examples are provided for illustrative purposes only and are in no way intended to limit the scope of the present invention:

EXAMPLE 1

A 140 µm thick microporous polysulfone support including the backing non-woven fabric was soaked in an aqueous solution containing 2 wt % of meta-phenylenediamine (MPD) and 0.3 wt % 2-ethyl-1,3-hexanediol for 40 seconds.

The support was drained and nip rolled to remove the excess aqueous solution. Then, the coated support was dipped in 0.1 wt % solution of trimesoyl chloride (TMC) in Isopar® solvent (Exxon Corp.) for 1 minute followed by draining the excess organic solution off the support. The resulting composite membrane was air-dried for about 1 minute, then rinsed in 0.2% $Na_2CO_3$ aqueous solution for 30 minutes at room temperature, and then rinsed in deionized water.

The resulting membrane was then sprayed on its top surface (i.e., onto the polyamide film) with an aqueous solution containing 0.1 wt % sorbitol tetraglycidyl ether, 0.04 wt % N,N,N',N'-tetramethyl-1,6-hexanediamine (TMHD), and 3 wt % glycerol (as a humectant) for 20 seconds and then drained to remove the excess aqueous solution. The membrane was then heated at 50° C. for 4 minutes followed by air drying for one day. The initial performance of the membrane was measured by passing an aqueous solution containing 2000 ppm of NaCl through the membrane in a crossflow mode at 225 psi and 25° C. The salt rejection was 99% and the flux was 22 gfd. The fouling resistance of the membrane was then evaluated under the same conditions described above by further adding 30 ppm dry milk to the feed water. (The protein of dry milk in an aqueous solution may exist as protein molecules and colloids, i.e., aggregates of protein molecules, and can be adsorbed to the membrane through hydrophobic interactions with the membrane surface.) After circulating the feed water through the membrane for 4 hours, the salt rejection was 99.4% and the flux was 17.6 gfd. Table 1 presents the data described above, as well as the corresponding data obtained from an otherwise identical membrane to which no coating was added (Comparative Example 1).

TABLE 1

| Membrane | Initial Salt Rejection (%) | Initial Flux (gfd) | Final Flux in the presence of dry milk (gfd) | Flux Decline (%) |
|---|---|---|---|---|
| Comparative Example 1 | 99 | 29 | 15.7 | 46 |
| Example 1 | 99 | 22.3 | 17.4 | 22 |

As can be seen, the coated membrane (Example 1) exhibited a considerably smaller decrease in flux than did the uncoated membrane (Comparative Example 1). This is advantageous because, as noted above, a consistency in flux over a long period of time is highly desirable since it obviates the need to continuously vary the operating pressure and to wash the membrane to remove fouling agents therefrom. It should also be recognized that, whereas the final flux for the present example was measured only after four hours of use, such membranes are expected to be continuously used for considerably longer periods of time. Accordingly, the final flux values given above are much more representative of the flux properties of the membranes over their respective lifetimes of use than are the initial flux values.

It should also be noted that, when the coated membrane was washed following its four hour period of use, its flux substantially returned to its initial flux whereas the uncoated membrane, when washed following its four hour period of use, only approached about 80% of its initial flux.

EXAMPLE 2

The same procedure as set forth in Example 1 was carried out for Example 2, except that 0.05 wt % 2,5-dihydroxybenzenesulfonic acid potassium salt was used instead of TMHD. The performance of the resulting membrane, as well as an otherwise identical membrane to which no coating was added (Comparative Example 2) are shown in Table 2.

TABLE 2

| Membrane | Initial Salt Rejection (%) | Initial Flux (gfd) | Final Flux in the presence of dry milk (gfd) | Flux Decline (%) |
|---|---|---|---|---|
| Comparative Example 2 | 99 | 27.3 | 22.5 | 17.6 |
| Example 2 | 99.4 | 23.2 | 20.9 | 9.9 |

As can be seen, the coated membrane exhibited a considerably smaller decrease in flux than did the uncoated membrane.

EXAMPLE 3

The same procedure as set forth in Example 1 was carried out for Example 3, except that 0.2 wt % glycerol triglycidyl ether and 0.04 wt % 2,2'-(ethylenedioxy)bis(ethylamine) were used instead of sorbitol tetraglycidyl ether and TMHD, respectively. The performance of the resulting membrane, as well as an otherwise identical membrane to which no coating was added (Comparative Example 3) are shown in Table 3.

TABLE 3

| Membrane | Initial Salt Rejection (%) | Initial Flux (gfd) | Final Flux in the presence of dry milk (gfd) | Flux Decline (%) |
|---|---|---|---|---|
| Comparative Example 3 | 97 | 51.7 | 25.8 | 46.8 |
| Example 3 | 97.7 | 39.2 | 23.5 | 32.6 |

As can be seen, the coated membrane exhibited a considerably smaller decrease in flux than did the uncoated membrane.

EXAMPLE 4

The same procedure as set forth in Example 1 was carried out for Example 4, except that 0.25 wt % polyethyleneglycol diglycidyl ether and 0.025 wt % polyethylene imine were used instead of sorbitol tetraglycidyl ether and TMHD, respectively. The performance of the resulting membrane, as well as an otherwise identical membrane to which no coating was added (Comparative Example 4) are shown in Table 4.

TABLE 4

| Membrane | Initial Salt Rejection (%) | Initial Flux (gfd) | Final Flux in the presence of dry milk (gfd) | Flux Decline (%) |
|---|---|---|---|---|
| Comparative Example 4 | 97 | 51.7 | 25.8 | 46.8 |
| Example 4 | 97 | 31.7 | 23.6 | 22.6 |

As can be seen, the coated membrane exhibited a considerably smaller decrease in flux than did the uncoated membrane.

EXAMPLE 5

The same procedure as set forth in Example 1 was carried out for Example 5, except that 1.1 wt % polyethyleneglycol diglycidyl ether, 0.05 wt % trifluoroacetic acid and 3 wt % glycerol (as a cross-linking agent and also as a humectant)

were used instead of sorbitol tetraglycidyl ether and TMHD, respectively. The performance of the resulting membrane, as well as an otherwise identical membrane to which no coating was added (Comparative Example 5) are shown in Table 5.

TABLE 5

| Membrane | Initial Salt Rejection (%) | Initial Flux (gfd) | Final Flux in the presence of dry milk (gfd) | Flux Decline (%) |
|---|---|---|---|---|
| Comparative Example 5 | 97.2 | 40.9 | 29.8 | 25.5 |
| Example 5 | 98.3 | 21.7 | 21.5 | 4.4 |

As can be seen, the coated membrane exhibited a considerably smaller decrease in flux than did the uncoated membrane.

EXAMPLE 6

The same procedure as set forth in Example 1 was carried out for Example 6, except that 0.15 wt % sorbitol tetraglycidyl ether, 0.06 wt % TMHD and 2 wt % glycerol were used instead of the corresponding quantities of each used in Example 1. In addition, 50 ppm dodecyltrimethylammonium bromide (DTAB), a cationic surfactant, was used instead of dry milk as the foulant. (DTAB can be adsorbed to the membrane by hydrophobic and/or ionic interactions with the membrane.) The performance of the resulting membrane, as well as an otherwise identical membrane to which no coating was added (Comparative Example 6) are shown in Table 6.

TABLE 6

| Membrane | Initial Salt Rejection (%) | Initial Flux (gfd) | Final Flux in the presence of dry DTAB (gfd) | Flux Decline (%) |
|---|---|---|---|---|
| Comparative Example 6 | 97 | 55.2 | 28.5 | 48.3 |
| Example 6 | 97.6 | 33.6 | 27.9 | 17.1 |

As can be seen, the coated membrane exhibited a considerably smaller decrease in flux than did the uncoated membrane.

EXAMPLE 7

Ten water drops were placed on an uncoated membrane prepared in the manner described in Example 1, and the contact angle for each such water drop on the uncoated membrane was measured. Then, the coating described in Example 1 was applied to the membrane, and ten water drops were placed on the coated membrane, with the contact angle for each such water drop being measured. The average measured contact angles for the drops on the uncoated membrane and the coated membrane were 54.6 degrees and 48.8 degrees, respectively. These results indicate that the coated membrane is more hydrophilic than the uncoated membrane since the coated membrane caused the water drops to spread more on the membrane whereas the uncoated membrane caused the water drops to bead on the membrane.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. A composite polyamide reverse osmosis membrane comprising:
   (a) a microporous support;
   (b) a polyamide layer on said microporous support; and
   (c) a hydrophilic coating on said polyamide layer, said hydrophilic coating being made by (i) applying to the polyamide layer a quantity of a polyfunctional epoxy compound, said polyfunctional epoxy compound selected from the group consisting of diglycerol triglycidyl ether; pentaerythritol triglycidyl ether; sorbitol triglycidyl ether; glycerol propoxylate triglycidyl ether; trimethylolpropane triglycidyl ether; 1,1,1-tris(hydroxymethyl)ethane triglycidyl ether; 1,1,1-tris(hydroxyphenyl)ethane triglycidyl ether; tris(hydroxymethyl)nitromethane triglycidyl ether; phloroglucinol triglycidyl ether; a reaction product of epichlorohydrin and 1,3,5,-tris(2-hydroxyethyl)cyanuric acid; a reaction product of epichlorohydrin and tris(hydroxymethyl)amino methane; sorbitol tetraglycidyl ether; pentaerythritol tetraglycidyl ether; polyglycerol tetraglycidyl ether; sorbitol pentaglycidyl ether; and sorbitol hexaglycidyl ether; and (ii) then, cross-linking the polyfunctional epoxy compound in such a manner as to yield a water-insoluble polymer, wherein said polyfunctional epoxy compound is cross-linked through at least one of self-polymerization and the help of a cross-linking compound said cross-linking compound differing from said polyamide layer.

2. The composite polyamide reverse osmosis membrane as claimed in claim 1 wherein said microporous support is made of a material selected from the group consisting of a polysulfone, a polyether sulfone, a polyimide, a polyamide, a polyetherimide, polyacrylonitrile, poly(methyl methacrylate), polyethylene, polypropylene and a halogenated polymer.

3. The composite polyamide reverse osmosis membrane as claimed in claim 1 wherein said polyamide layer is the interfacial reaction product of a polyfunctional amine and a polyfunctional amine-reactive reactant.

4. The composite polyamide reverse osmosis membrane as claimed in claim 3 wherein said polyfunctional amine is at least one member selected from the group consisting of an aromatic primary diamine and substituted derivatives thereof, an alkane primary diamine, a cycloaliphatic primary diamine, a cycloaliphatic secondary diamine, an aromatic secondary diamine and a xylylene diamine.

5. The composite polyamide reverse osmosis membrane as claimed in claim 4 wherein said polyfunctional amine is meta-phenylenediamine.

6. The composite polyamide reverse osmosis membrane as claimed in claim 4 wherein said polyfunctional amine is piperazine.

7. The composite polyamide reverse osmosis membrane as claimed in claim 3 wherein said polyfunctional amine-reactive reactant is at least one member selected from the group consisting of a polyfunctional acyl halide, a polyfunctional sulfonyl halide and a polyfunctional isocyanate.

8. The composite polyamide reverse osmosis membrane as claimed in claim 7 wherein said polyfunctional amine-reactive reactant is trimesoyl chloride.

9. The composite polyamide reverse osmosis membrane as claimed in claim 1 wherein said polyfunctional epoxy compound is cross-linked solely through self-polymerization.

10. The composite polyamide reverse osmosis membrane as claimed in claim 1 wherein said polyfunctional epoxy compound is cross-linked with the help of said cross-linking compound.

11. The composite polyamide reverse osmosis membrane as claimed in claim 10 wherein said cross-linking compound comprises at least two epoxy-reactive groups selected from the group consisting of hydroxy groups; amino groups; amide groups; carbonyl groups; and sulfurhydryl (thiol) groups.

12. The composite polyamide reverse osmosis membrane as claimed in claim 11 wherein said at least two epoxy-reactive groups are the same.

13. The composite polyamide reverse osmosis membrane as claimed in claim 11 wherein said at least two epoxy-reactive groups are different.

14. The composite polyamide reverse osmosis membrane as claimed in claim 11 wherein said cross-linking compound is at least one member selected from the group consisting of ethylene glycol; propylene glycol; 1,3-propanediol; 1,3-butanediol; 1,4-butanediol; 1,5-pentanediol; 1,2-pentanediol; 2,4-pentanediol; 1,6-hexanediol; 1,2-hexanediol; 1,5-hexanediol; 2,5-hexanediol; 2-ethyl-1,3-hexanediol; 1,7-heptanediol; 1,2-octanediol; 1,8-octanediol; 1,9-nonanediol; 1,10-decanediol; 1,2-decanediol; glycerol; trimethylolpropane; 1,1,1-tris(hydroxymethyl)ethane; 1,1,1-tris(hydroxyphenyl)ethane; tris(hydroxymethyl)aminomethane; tris(hydroxymethyl)nitromethane; 1,3,5-tris(2-hydroxyethyl)cyanuric acid; pentaerythritol; sorbitol; glucose; fructose; maltose; mannose; glucosamine; mannosamine; a polysaccharide; neopentyl glycol; hydroquinone, resorcinol; isocyanuric acid; phloroglucinol; polyvinyl phenol; polyacrylamide; polyethylene glycol with the repeating ethylene glycol unit $(CH_2CH_2O)_n$ wherein n ranges from 2 to 400, inclusive; and polypropylene glycol with the repeating ethylene glycol unit $((CH_3)CH_2CH_2O)_n$ wherein n ranges from 2 to 100, inclusive.

15. The composite polyamide reverse osmosis membrane as claimed in claim 11 wherein said cross-linking compound is at least one member selected from the group consisting of N,N,N',N'-tetramethylethylenediamine; N,N,N',N'-tetramethyl-1,3-propanediamine; N,N,N',N'-tetramethyl-1,3-butanediamine; N,N,N',N'-tetramethyl-1,4-butanediamine; N,N,N',N'-tetramethyl-1,6-hexanediamine; 1,4-diazabicyclo[2.2.2]octane; 1,8-diazabicyclo[5.4.0]undec-7-ene; 1,5-diazabicyclo[4.3.0]non-5-ene; N,N,N',N',N"-pentamethyldiethylenetriamine; and 1,1,3,3-tetramethylguanidine.

16. The composite polyamide reverse osmosis membrane as claimed in claim 11 wherein said cross-linking compound is at least one member selected from the group consisting of tartaric acid; gluconic acid; glucuronic acid; 3,5-dihydroxybenzoic acid; 2,5-dihydroxybenzenesulfonic acid potassium salt; and 2,5-dihydroxy-1,4-benzenedisulfonic acid dipotassium salt.

17. The composite polyamide reverse osmosis membrane as claimed in claim 11 wherein said cross-linking compound is at least one member selected from the group consisting of 3,5-diaminobenzoic acid; 2-aminoethanesulfonic acid (taurine); 2-{[tris(hydroxymethyl)methyl]amino}-1-ethanesulfonic acid; 3-{[tris(hydroxymethyl)methyl]amino}-1-propanesulfonic acid; 2-hydroxy-3-{[tris(hydroxymethyl)methyl]amino}-1-propanesulfonic acid; β-hydroxy-4-(2-hydroxyethyl)-1-piperazinepropanesulfonic acid; β,β'-dihydroxy-1,4-piperazinebis(propanesulfonic acid); and 2,5-diaminobenzenesulfonic acid.

18. The composite polyamide reverse osmosis membrane as claimed in claim 1 wherein said polyfunctional epoxy compound is sorbitol tetraglycidyl ether.

* * * * *